United States Patent [19]

Stewart

[11] 4,031,859

[45] June 28, 1977

[54] COLLAR FOR A SMALL ANIMAL

[76] Inventor: James P. Stewart, 14605 SE. Fairwood Blvd., Renton, Wash. 98055

[22] Filed: May 23, 1974

[21] Appl. No.: 472,733

[52] U.S. Cl. .............................. 119/106; 40/21 C
[51] Int. Cl.² ................................. A01K 27/00
[58] Field of Search .................... 119/106, 156; 239/34–36, 52–57, 60; 2/320; 40/21 C

[56] References Cited

UNITED STATES PATENTS

| 1,657,250 | 1/1928 | Fetters | 119/106 |
| 2,205,711 | 6/1940 | Banks | 119/106 |
| 2,401,253 | 5/1946 | Lamb, Jr. | 119/106 |
| 2,791,202 | 5/1957 | Doyle | 119/106 |
| 2,900,696 | 8/1959 | Bacon | 119/106 X |

Primary Examiner—J.N. Eskovitz
Attorney, Agent, or Firm—Thomas W. Secrest

[57] ABSTRACT

This invention is directed to a collar for a small animal wherein the collar provides a control for releasing a chemical toxic to pests such as fleas and ticks on the small animal. Also, the collar comprises a releasable catch so that a small animal, upon tugging upon the collar, can pull apart the collar and escape. In addition, the collar provides means for carrying identification with the name of the owner or the person to contact if the small animal or pet is lost.

12 Claims, 31 Drawing Figures

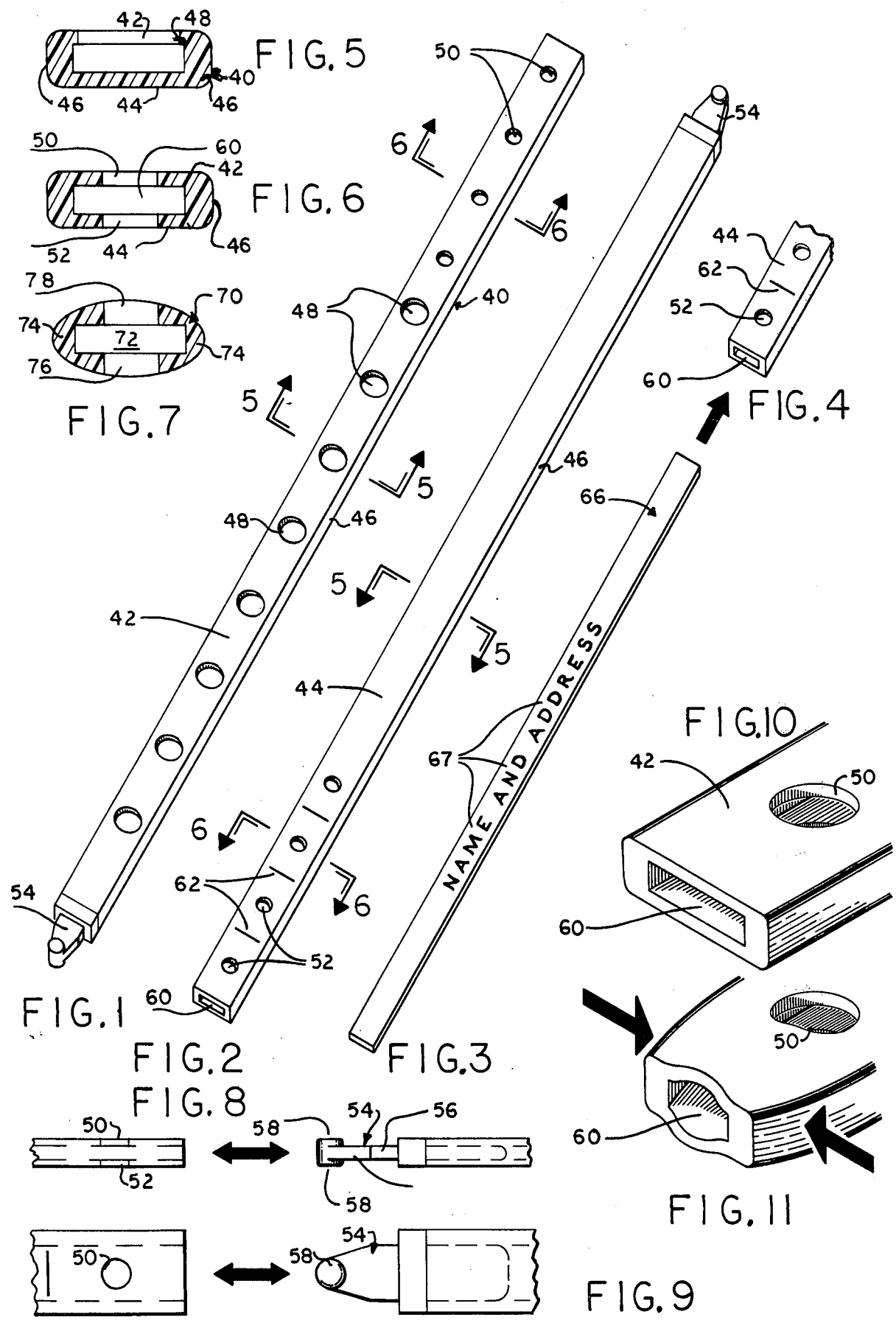

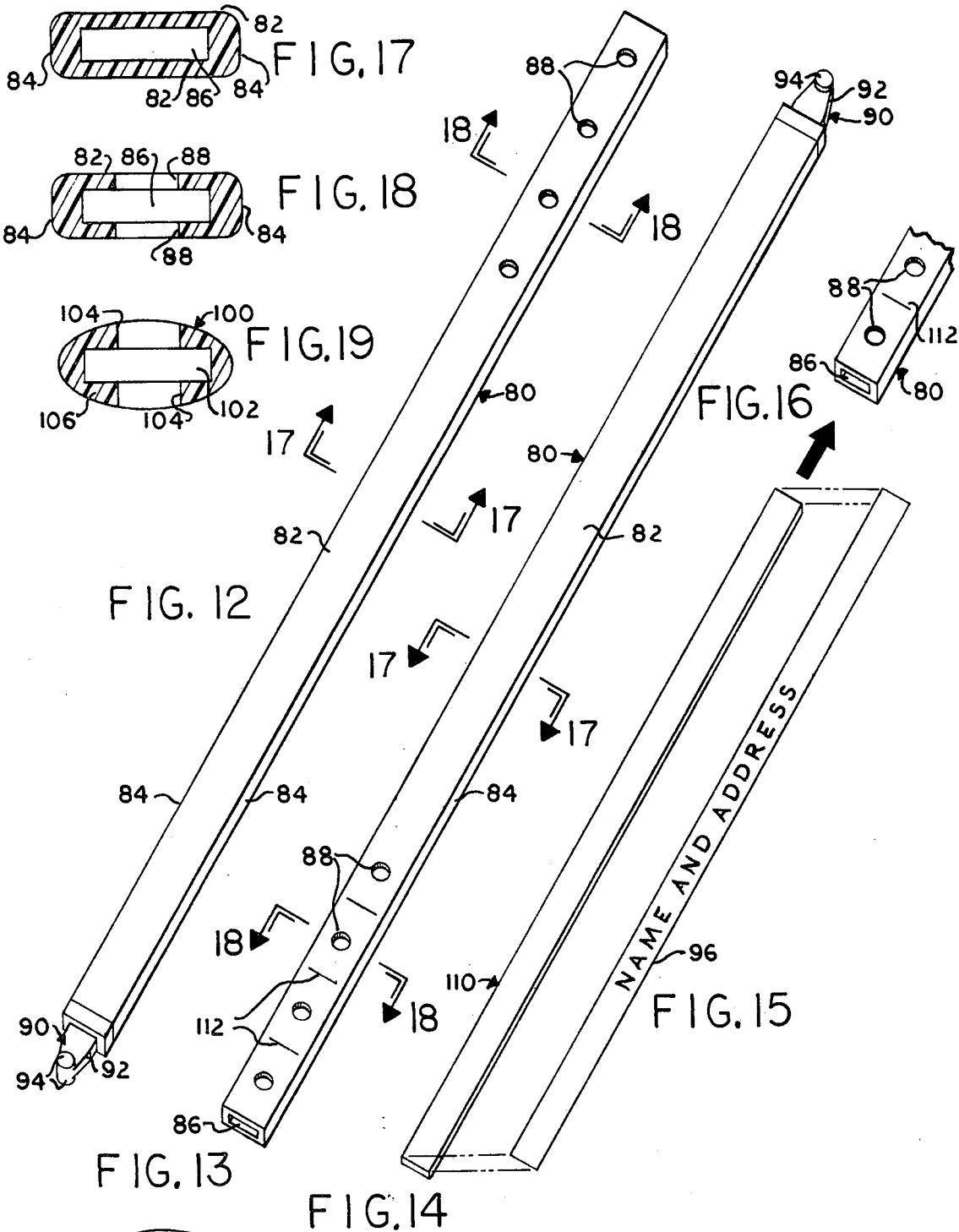

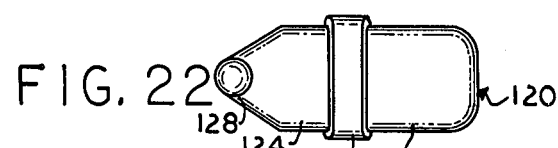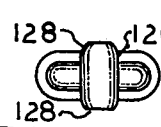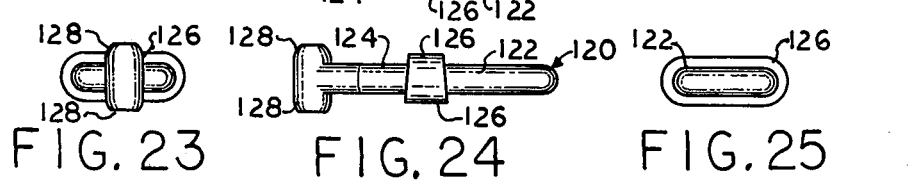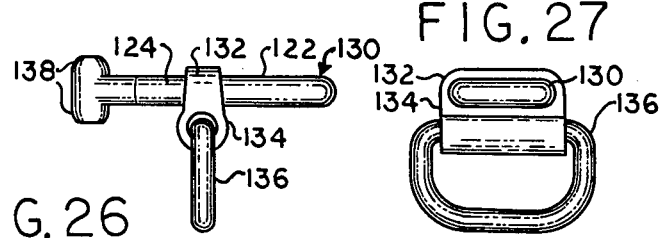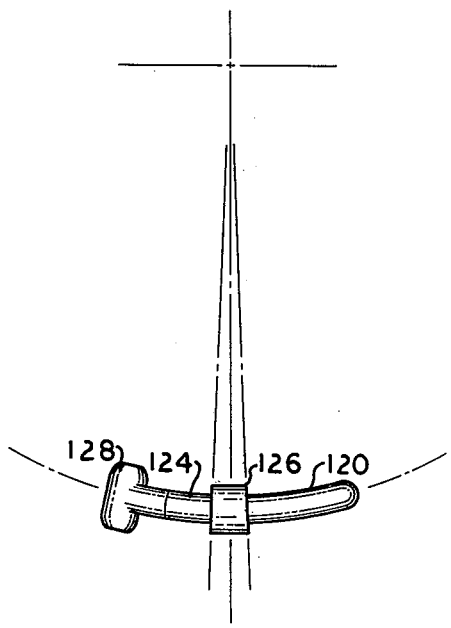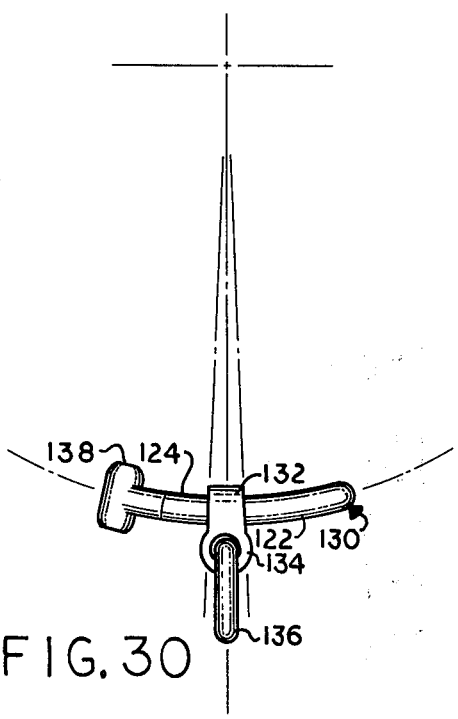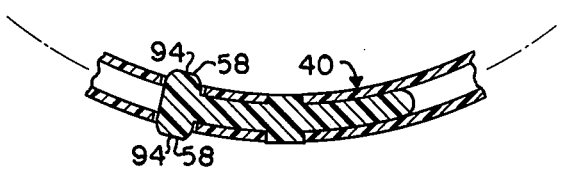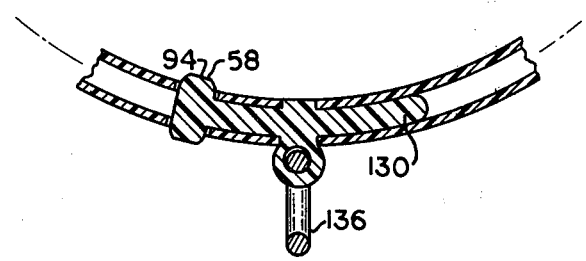

COLLAR FOR A SMALL ANIMAL

GENERAL BACKGROUND OF THE INVENTION

Over the years I have had a number of small animals as pets and have also owned a number of collars for these small animals.

There are commercially available collars for small animals for controlling pests such as fleas and ticks. These particular collars comprise a flexible carrier for a chemical toxic to the pests. Also, the carrier has a clasp means, such as a buckle, for firmly positioning the collar around the neck of the small animal.

The carriers for the toxic chemical are in direct contact with the fur and the skin of the small animals. The chemical which is toxic to the pests may also be toxic to a small animal so as to produce a neurotropic toxicity (nerve toxicity). Either the concentration of the chemical becomes too great or the animal is unusually sensitive and develops this nerve irritation. Further, the chemical in the carrier may produce a dermal toxicity which manifests itself as a primary contact dermatitis. The dermal toxicity, as with nerve toxicity, may result from too great a concentration of the chemical or an unusual sensitivity in a particular individual animal.

Further, I have noticed that with many collars for small animals, the buckle is so strong or the catching means for positioning the collar on the small animal is so strong that the small animal may get the collar caught on a wire or in brush and not be able to pull away and, therefore, is trapped. I have also observed a cat scratching itself around the collar and on its neck and which cat managed to move its front leg between the collar and its own neck and to get the leg so far into the collar that it was trapped and the cat had difficulty moving on three legs. Further, I have seen a cat position its leg through the collar, or between the collar and the neck, and move the leg so far forward in the collar that the collar rubbed the skin so as to produce an open sore which required considerable time to heal.

Also, many small animals will stray away from their master or their place of living and become lost. There is no identification on these small animals so the animal cannot be returned to its rightful owner.

With this knowledge and background of collars for small animals, I have invented the subject collar.

BRIEF DESCRIPTION OF THE INVENTION

The collar comprises a strip which is impregnated with a chemical toxic to pests carried by small animals and which pests, for example, are fleas and ticks. There is a sheath for covering said strip. The strip may be inserted into said sheath so that the strip or carrier for the toxic chemical is not in direct contact with the fur and skin of the small animal. Further, the sheath is designed to control the flow of the chemical from the strip to the fur and skin of the small animal.

In addition, the collar comprises a releasable catch so that if the small animal works a leg through the collar or catches the collar on a wire or branch or other object, the small animal, by tugging and pulling, can release the catch so as to pull away from the collar and not be hurt or harmed.

In addition, the sheath is so designed that an identification piece with the name, address and telephone number of the owner of the small animal can be inserted into the sheath for viewing by a person finding the lost or strayed small animal. It is to be realized that with many collars for a small animal a metal chain or leather strap with a metal or plastic identification plate is wrapped around the neck of the small animal and, if the small animal catches the collar on an object such as a wire or a branch or other fixed object, the small animal might not be able to escape and could, possibly, perish.

OBJECTS AND ADVANTAGES OF THE INVENTION

With this background in regard to collars for small animals, an object and advantage of this invention is to keep a strip impregnated with a toxic chemical in a sheath so that there is less possibility for rain and water to contact the strip and the toxic chemical so as to release a liquid for direct contact with the skin and fur of the small animal and which liquid is toxic; a further object is to more completely control the rate of vaporization of the toxic chemical in the strip so as to control the concentration of the toxic chemical coming in contact with the fur and skin of the small animal and, thereby, lessen the possibility of irritation to the small animal; an additional object is to provide a means for carrying identification for the small animal and the owner of the small animal; another object is to provide a decorative effect for the small animal and which decorative effect is realized from the identification strip for the small animal; another important object is to provide a collar with a releasable catch which makes it possible for the small animal to tug and pull so as to pull apart the collar and not be trapped; an additional object is to provide a collar made of a soft, flexible and resilient material which flexes with the animal and does not cause irritation to the skin of the animal; another object is to provide a collar wherein it is necessary to replace only the insert in the sheath of the collar and not the entire collar; and, a further object is to provide a collar having a toxic chemical and because of the controlled release of the toxic chemical from the collar, the collar has a longer life with respect to releasing the chemical toxic to pests on the small animal.

THE DRAWINGS

FIG. 1 is a perspective view of the underside of the collar which receives a chemically treated insert;

FIG. 2 is a perspective view of the outside of said collar;

FIG. 3 is a perspective view of a chemically treated insert for placing in the collar and which insert shows indicia for identifying the owner of the small animal;

FIG. 4 is a fragmentary perspective view looking at that end of the collar for receiving a catch means;

FIG. 5, taken on lines 5—5 of FIGS. 1 and 2, is a lateral cross-sectional view illustrating the passageway in the collar for allowing the chemical in the insert to pass through the collar;

FIG. 6, taken on lines 6—6 of FIGS. 1 and 2, is a lateral cross-sectional view illustrating the holes for receiving the catch means of the collar;

FIG. 7 is a lateral cross-sectional view illustrating another configuration of the collar and which collar is relatively stiff because of the thickened walls of the collar;

FIG. 8 is a fragmentary side elevational view illustrating the catch means on one end of the collar for coaction with the holes on the other end of the collar;

FIG. 9 is an exploded fragmentary plan view illustrating the catch means on one end of the collar for insertion into the holes on the other end of the collar;

FIG. 10 is a fragmentary perspective view illustrating the end of the collar for receiving the catch means;

FIG. 11 is a fragmentary end view illustrating the end of the collar being squeezed so as to deform the longitudinal passageway in the collar for receiving the studs on the catch means on the other end of the collar;

FIG. 12 is a perspective view looking at a first face of a collar and illustrates a catch means with studs on one end and on the other end holes for receiving the studs;

FIG. 13 is a perspective view of the other face of the collar;

FIG. 14 is a chemically treated insert for inserting into the collars of FIGS. 1 and 2;

FIG. 15 is an identification insert for insertion into the collars of FIGS. 1 and 2 and also into the collars of FIGS. 12 and 13;

FIG. 16 is a fragmentary perspective view illustrating the end of the collar, with holes, of FIGS. 12 and 13;

FIG. 17, taken on lines 17—17 of FIGS. 12 and 13, is a lateral cross-sectional view illustrating the wall thickness and the configuration of the walls;

FIG. 18, taken on lines 18—18 of FIGS. 12 and 13, is a lateral cross-sectional view illustrating the walls and the holes in the collar for receiving the studs of the catch means;

FIG. 19 is a lateral cross-sectional view illustrating the walls of the collar and which walls are thick so as to resist deformation;

FIG. 20 is a view of the collar illustrating the catch means with the studs for insertion into the deformed end of the collar for mating with the holes;

FIG. 21 is a view of the collar with the catch means inserted into the end of the collar to form a loop;

FIGS. 22—25 are views of the catch means and wherein FIG. 22 is a plan view of the catch means;

FIG. 23 is an end elevational view of the catch means showing the studs;

FIG. 24 is a side elevational view of the catch means showing the studs;

FIG. 25 is an end elevational view of the catch means;

FIGS. 26 and 27 are directed to another catch means wherein in FIG. 26, a side elevational view of the catch means, there is illustrated a ring for attachment of license tags, etc., and FIG. 27 is an end elevational view illustrating the ring;

FIG. 28 is a side elevational view of the catch means and illustrates the radius of curvature to which the catch means will be molded;

FIG. 29 is a fragmentary longitudinal cross-sectional view of the catch means in the collar with the studs in the holes;

FIG. 30 is a side-elevational view of the alternate catch means with the ring and illustrates the radius of curvature to which the catch means will be formed; and FIG. 31 is a fragmentary vertical longitudinal cross-sectional view illustrating the alternate catch means in the collar with the studs in the holes in the collar.

DETAILED DESCRIPTION OF THE INVENTION

With reference to the drawings and in particular FIGS. 1 and 2, it is seen that there is provided a collar 40 which is of a generally tubular construction. The collar 40 comprises an inner surface 42 and an outer surface 44 with sides 46.

On the inner surface 42, there are a large number of holes or passageways 48, see FIGS. 1 and 5.

Near one end of the collar 40 and in the surface 42 are a number of passageways 50. In the surface 44 are a number of passageway 52. The passageways 50 and 52 are aligned, see FIG. 6.

In FIGS. 1, 2, 8 and 9, it is seen that there is provided a catch 54 having a tongue portion 56 and two outwardly directed stud portions 58.

The tongue 56 may be inserted into the tubular housing of the collar 40 so that the studs 58 fit in the passageways 50 and 52. More particularly, in FIGS. 2 and 10, it is seen that the collar 40 has a tubular passageway 60. By squeezing or placing pressure on the sidewalls 46 of the collar 40, the passageway 60 is changed in configuration so as to readily accept the catch means 54. The catch means 54 can be inserted into the deformed passageway 60 so that the studs 58 fit into the passageways or openings 50 and 52. Then, the pressure can be released and the collar is firmly positioned.

In FIG. 2, it is seen that there is a series of indicia 62 for indicating a place to cut the collar 40 to achieve the correct length for the collar around the neck of a small animal such as a cat or a dog.

In FIG. 3, there is illustrated an insert 66. The insert 66 is a flexible plastic strip and is impregnated with a pesticide or an insecticide. A typical pesticide or insecticide is: Dimethyl 2,2-dichlorovinyl phosphate; Diethyl 2-chlorovinyl phosphate; Dimethyl 2-chlorovinyl phosphate; Diethyl 2,2-dichlorovinyl phosphate; Dimethyl 2,2-dibromovinyl phosphate; Dimethyl 2-bromovinyl phosphate; Diethyl 2,2-dibromovinyl phosphate; or Diethyl 2-bromovinyl phosphate. Also, on the insert 66, there may be indicia 67 indicating the name and address and telephone number of the owner of the small pet. If the small pet strays from home or, accidentally, is killed, the name of the owner and the address are given so that the owner can be easily contacted.

The collar illustrated in FIGS. 1, 2, 4, 5, 6, 8, 9, 10, and 11 is of a soft, flexible, resilient plastic which is, preferably, translucent or transparent so that the indicia 67 on the insert 66 can be easily read. Also, the soft, flexible, resilient plastic is easily deformed so that the collar can be wrapped around the neck of the small animal and the catch means 54 inserted into the end of the collar. The catch means 54, comprising the tongue 56 and the studs 58, is such that if the small animal gets the collar caught, then the small animal can pull and apply sufficient force to the collar to deform the soft, flexible, resilient plastic so that the studs 58 fall out of the holes or passageways 50 and 52 so as to unclamp the collar and to release the small animal so that the small animal will not be caught and, possibly, perish. This is especially advantageous for a small animal such as a cat.

In FIG. 7, there is illustrated a cross section of a collar 70 having a through passageway 72 and in this cross-sectional view, it is seen that the collar is of a, generally, elliptical configuration having thick walls 74. In the thick walls 74 are passageways 76 and 78 for receiving the studs 58 on the end of the tongue 56. The studs 58, for fitting into the holes or passageways 76 and 78 of collar 70, are longer than the studs 58 of collar 40. With the collar 70, it will be difficult for a small animal to apply sufficient force to the collar to pull the studs 58 out of the holes 76 and 78. Therefore, the collar 70 may be more suited for a dog than for a cat.

In FIG. 1, it is seen that the holes or passageways 48 are on the inner surface 42. With the insert 66 in the collar 40, the holes or passageways 48 are next to the skin or fur of the small animal. The insert 66 releases some of the insecticide or pesticide in the tubular passageway 60. Then, this insecticide works its way through the holes 48 and into contact with the fur and the skin of a small animal. As is readily appreciated from Dalton's Law of Partial Pressures, there is a buildup of the concentration of the insecticide in the passageways 60. This will retard the release of the insecticide from the insert 66 so as to, in effect, lengthen the life of the active insecticide in the insert 66. For example, if the insert 66 were the collar itself and not enclosed in the tubular housing of the collar 40, the insecticide would be free to vaporize from the entire surface of the insert 66 and therefore assume the vapor state at a much more rapid rate than when the insert 66 is in the passageway 60 in the housing 40. Again, the holes or passageways 48 are the only effective avenues of escape for the insecticide to pass from the tubular passageway 60 to outside the collar 40.

The rate of release of the insecticide from the insert 66 is a function of both temperature and humidity. A warm, dry climate, for example, would produce a higher rate of vaporization than would a cool, damp climate. Therefore, the number and size of the holes 48 in a collar intended for a warm climate would be less than in a collar intended for a cool climate. Further, in a humid climate, the number and size of the holes 48 would be greater than in a collar intended for a dry, arid climate. This provision for varying the number and size of the holes 48 functions, then, as a control or valve to permit an optimum rate of release of the insecticide from the insert 66. If the collar itself was comprised of solid plastic impregnated with insecticide, there would be no control over the release of the insecticide and there would be the possibility of an overdose of said insecticide with unpleasant side effects for the animal.

In FIGS. 12 and 13, there is illustrated another species 80 of the collar comprising outer surfaces 82 and sidewalls 84. In the collar 80 is a tubular passageway 86 defined by the outer walls or outer surfaces 82 and the sidewalls 84. At one end of the collar 80 are holes or passageways 88 in the walls 82. The holes or passageways are in pairs and are aligned with each other. In the other end of the tubular collar 80 is a catch means 90 comprising a tongue 92 and studs 94.

In FIG. 15, there is illustrated an insert 96 having a place for indicia such as the name and address and telephone number of the owner of the small animal. The insert 96 is to be inserted by itself into the tubular passageway 86 of collar 80 or the tubular passageway 102 of collar 100. Collars 80 and 100 are not intended to receive chemically treated inserts such as 66 or 110. Collars 80 and 100 are, rather, primarily intended for use as untreated, decorative, identification collars. Collars 80 and 100 may, however, in cases requiring high concentrations of an insecticide, or other chemical, be, themselves impregnated. In either case, insert 96 is utilized for identification and decorative purposes.

The material or construction of the collar 80 is a soft, flexible, resilient, transparent plastic which can be bent into a circle as illustrated in FIGS. 20 and 21 so as to fit around the neck of the small animal. In FIG. 20, it is seen that one end of the collar having the holes 88 is deformed so as to receive the studs 94. In FIG. 21, it is seen that the collar is in the form of a circle or a ring.

If a small animal, wearing the collar 80, is caught by means of the collar, then the small animal, such as a cat, can apply sufficient force to this collar to pull the studs 94 out of the holes or passageways 88 so as to release the collar and thereby be released itself.

In FIG. 19, there is illustrated a collar 100. In a lateral cross-sectional view, it is seen that the collar 100 is of a generally elliptical configuration. The collar 100 has a through passageway 102, aligned openings 104 for receiving studs 94, and thick walls 106. The walls 106 are of sufficient thickness as not to be readily deformed. Therefore, a collar 100 cannot be readily pulled apart by a small animal applying force to the collar so as to pull the studs 94 out of the holes or passageways 104. The collar 100 is primarily intended to to used on a dog.

In FIG. 14, there is illustrated an insert 110, mentioned previously, for insertion into passageway 60 of collar 40 or passageway 72 of collar 70. The insert 110, a plastic strip impregnated with an insecticide or pesticide, is similar to insert 66 except that it does not bear identification indicia. Rather, it is intended that insert 110 be used in conjunction with insert 96. This option allows the occasional or intermittent use of an insecticide or pesticide while retaining the decorative and identification benefits of insert 96. This is an advantage in those cases where the insecticide or pesticide causes adverse side effects in the small animal if worn continuously.

Again, In FIG. 13, it is seen that on the collar 80 there are indicia 112 between the holes or passageways 88. If the collar is too long for the small animal, it is possible to cut off the collar at the desired indicia and to form the collar to the correct length for fitting around the neck of the small animal.

In FIGS. 22–25, there is illustrated a catch means 120 for an animal collar and which catch means 120 comprises two flat tongue portions 122 and 124 separated by a shoulder 126. Further, it is seen that the tongue portion 124 narrows down and on its narrow end has two outwardly directed studs 128.

In FIG. 29, it is seen that the catch means 120 is inserted into the passageway 60 in the collar 40 or is inserted into the tubular passageway 86 in the collar 80. The shoulder 126 fits against the end of the walls of the collar. In use, the tongue portion 122 is coated with a resin or adhesive and inserted into the passageway in the collar. This firmly attaches the catch means 120 to the collar 40 or 80. Then, the studs 58 or 94 can be inserted into the proper holes or passageways 50 and 52 or 88 in the collar so as to form a releasable catch.

In FIG. 28, it is seen that the catch means 120 is molded to a desired radius to fit the curvature of the neck of a small animal.

In FIGS. 26 and 27, there is illustrated a catch means 130 having a tongue 122, a tongue 124, and a shoulder 132 with the depending boss 134. In the depending boss 134 is a ring 136. On the outer end of the tongue 124 are studs 138. The studs 138 in the catch means 130 are longer than the studs 128 in the catch means 120 as catch means 130 is more intended to be used with collars 70 and 100.

In FIG. 31, it is seen that the catch means 130 is inserted into the passageway 72 in the collar 70 or into the passageway 102 in the collar 100. Again, the tongue 122 is coated with a resin or adhesive and inserted into the passageway 72 or 102 so as to bond the catch means to the collar. The studs 138 are to be inserted into the holes or passageways 76 and 78 in the collar 70 or 104 in the collar 100.

The ring 136 is used for holding a license tag or the like.

From the foregoing, it is seen that I have provided a collar for a small animal, such as a cat or a dog, and which collar may be used as a decorative identification collar and/or as a device for controlling the flow of an insecticide or pesticide to the fur or skin of the small animal. In addition to being used with a cat or a dog, this collar can be used with other small animals or pets such as a skunk or a ferret.

From the foregoing and having presented my invention, what I claim is:

1. A collar for a small animal, said collar comprising:
 a. a tubular housing;
 b. said tubular housing having a tubular passageway extending the entire length of said tubular housing;
 c. an insert for positioning in said tubular passageway;
 d. said tubular housing having a first end and a second end;
 e. said tubular housing near said first end having a pair of opposing holes in the walls and which opposing holes connect with said tubular passageway;
 f. said tubular housing near said second end having a tongue;
 g. said tongue having a first end and a second end with said first end being in said tubular passageway and said tongue being secured to said tubular housing;
 h. said tongue on said second end having opposed studs for mating with said opposing holes to form a collar from said tubular material; and,
 i. said tubular housing being soft, flexible and resilient.

2. A collar according to claim 1 and comprising:
 a. said insert bearing indicia for identification.

3. A collar according to claim 1 and comprising:
 a. said tubular housing having a hole in a wall for connecting said tubular passageway to the exterior of said collar;
 b. said insert comprising a chemical for assisting said small animal; and,
 c. said hole being a control means for controlling the flow of said chemical from said insert to the outside of tubular housing.

4. A collar according to claim 3 and comprising:
 a. said insert bearing indicia for identification.

5. A collar according to claim 1 and comprising:
 a. said tubular housing, in a lateral cross-sectional view being of a, generally, rectangular configuration and having thin walls; and,
 b. said collar, upon being pulled, separating at the connection of said two studs and said two opposing holes.

6. A collar according to claim 5 and comprising:
 a. said insert bearing indicia for identification.

7. A collar according to claim 5 and comprising:
 a. said tubular housing having a hole in a wall for connecting said passageway to the exterior of said collar;
 b. said insert comprising a chemical for assisting said small animal; and,
 said hole being a control means for controlling the flow of said chemical from said insert to the outside of tubular housing.

8. A collar according to claim 5 and comprising:
 a. said tongue having a curvature; and,
 b. the radius of said curvature being, approximately, that of the radius of curvature of the neck of the small animal wearing the collar.

9. A collar according to claim 1 and comprising:
 a. said tubular housing having thick walls; and
 b. said collar, upon being pulled by the small animal, being rigid at the connection of said two studs and said two opposing holes and not separating.

10. A collar according to claim 9 and comprising:
 a. said insert bearing indicia for identification.

11. A collar according to claim 9 and comprising:
 a. said tubular housing having a hole in a wall for connecting said passageway to the exterior of said collar;
 b. said insert comprising a chemical for assisting ssid small animal; and,
 c. said hole being a control means for controlling the flow of said chemical from said insert to the outside of tubular housing.

12. A collar according to claim 9 and comprising:
 a. said tongue having a curvature; and,
 b. the radius of said curvature being, approximately, that of the radius of curvature of the neck of the small animal wearing the collar.

* * * * *